(12) United States Patent
Zheng

(10) Patent No.: US 11,668,046 B2
(45) Date of Patent: Jun. 6, 2023

(54) SOFT-SUBSTRATE CARPET MADE FROM RECYCLED YARNS AND METHOD FOR MANUFACTURING SAME

(71) Applicant: SUZHOU TUNTEX FIBER & CARPET CO., LTD., Suzhou (CN)

(72) Inventor: Shouquan Zheng, Suzhou (CN)

(73) Assignee: SUZHOU TUNTEX FIBER & CARPET CO., LTD., Suzhou (CN)

( * ) Notice: Subject to any disclaimer, the term of this patent is extended or adjusted under 35 U.S.C. 154(b) by 58 days.

(21) Appl. No.: 17/403,320

(22) Filed: Aug. 16, 2021

(65) Prior Publication Data

US 2021/0372043 A1 Dec. 2, 2021

Related U.S. Application Data

(63) Continuation of application No. PCT/CN2020/081288, filed on Mar. 26, 2020.

(51) Int. Cl.
*D06N 7/00* (2006.01)
*B29C 48/285* (2019.01)
*B32B 37/12* (2006.01)

(52) U.S. Cl.
CPC ......... *D06N 7/0076* (2013.01); *B29C 48/288* (2019.02); *B32B 37/1284* (2013.01);
(Continued)

(58) Field of Classification Search
CPC .. A47G 27/0212; B29C 48/288; B32B 3/085; B32B 5/022; B32B 5/024; B32B 5/26; B32B 5/265; B32B 5/266; B32B 7/12; B32B 27/08; B32B 27/12; B32B 27/20; B32B 27/302; B32B 27/32; B32B 33/00; B32B 37/1207; B32B 37/1284; B32B 2037/1215; B32B 2037/1223; B32B 2037/243; B32B 38/00; B32B 38/164; B32B 2038/166; B32B 2255/02; B32B 2255/26; B32B 2262/02; B32B 2307/304; B32B 2307/51; B32B 2471/02; C08K 3/26; C08K 2003/265; C09J 11/04; C09J 123/02; D05C 17/02; D06N 7/0063; D06N 7/0065; D06N 7/0068; D06N 7/0071; D06N 7/00073; D06N 7/0076; D06N 7/0078; D06N 7/0081; D06N 7/0086; D06N 2201/0254; D06N 2201/0263;
(Continued)

(56) References Cited

U.S. PATENT DOCUMENTS 3,533,893 A * 10/1970 Hartstein ............... D05C 17/02
428/95
4,522,857 A * 6/1985 Higgins ............... D06N 7/0073
428/95
(Continued)

*Primary Examiner* — Michael A Tolin
(74) *Attorney, Agent, or Firm* — CBM Patent Consulting, LLC

(57) ABSTRACT

A soft-substrate carpet made from recycled yarns includes a carpet fiber layer and a recycled fiber layer in a top-to-bottom order, wherein the carpet fiber layer comprises carpet fibers and a first non-woven scrim, the carpet fibers being tufted on the first non-woven scrim, and the recycled fiber layer comprises recycled fibers and a second non-woven scrim, the recycled fibers being tufted on the second non-woven scrim; the carpet fiber layer and the recycled fiber layer are permanently bonded.

1 Claim, 2 Drawing Sheets

(52) U.S. Cl.
CPC ......... *D06N 7/0065* (2013.01); *D06N 7/0073* (2013.01); *D06N 7/0081* (2013.01); *D06N 7/0086* (2013.01); *D06N 2201/0254* (2013.01); *D06N 2201/06* (2013.01); *D06N 2205/18* (2013.01); *D10B 2321/022* (2013.01); *D10B 2331/04* (2013.01); *D10B 2503/042* (2013.01)

(58) Field of Classification Search
CPC ......... D06N 2201/06; D06N 2205/023; D06N 2205/04; D06N 2205/045; D06N 2205/18; D10B 2321/02; D10B 2321/021; D10B 2321/022; D10B 2331/02; D10B 2331/04; D10B 2503/041; D10B 2503/042; Y10T 428/23979; Y10T 428/23986; Y10T 428/23993
See application file for complete search history.

(56) References Cited

U.S. PATENT DOCUMENTS

| | | | | |
|---|---|---|---|---|
| 4,649,069 | A * | 3/1987 | Tone | D06N 7/0081 |
| | | | | 428/95 |
| 5,217,783 | A * | 6/1993 | Roth | D06N 7/0039 |
| | | | | 428/95 |
| 5,380,574 | A * | 1/1995 | Katoh | B60N 3/048 |
| | | | | 428/95 |
| 7,884,038 | B2 * | 2/2011 | Roding | B60R 13/0815 |
| | | | | 442/373 |
| 2015/0125648 | A1 * | 5/2015 | Roding | B60N 3/042 |
| | | | | 428/90 |

* cited by examiner

SOFT-SUBSTRATE CARPET MADE FROM RECYCLED YARNS AND METHOD FOR MANUFACTURING SAME

TECHNICAL FIELD

The present invention relates to the technical field of carpet manufacturing, and particularly relates to a soft-substrate carpet made from recycled yarns and a method for manufacturing the same.

BACKGROUND

At present, most carpets made in China adopt a substrate of a tufted surface adhered with PVC or bitumen, and a glass fiber layer can be added in the process to improve the dimensional stability of the carpet, or a non-woven-based substrate is adhered on the carpet after tufting the carpet surface. However, PVC substrates used in carpets are generally hard and uncomfortable, and thus many manufacturers have been trying to find a novel material to replace PVC as a carpet substrate. Compared with the PVC material, the non-woven-based substrate is relatively soft, but the quality deterioration in use is still evident due to the physical properties such as dimensional instability and easy warping. Therefore, it is desirable to find a substrate which has the stability of PVC/bitumen and the comfort of a soft substrate and is integrated with the scientific concept of recycling and environmental protection.

It was found that some defective products may be produced during the production and processing of fibers due to color variation, abnormal physical properties, and color change transition, and such defective products are unusable for producing normal carpets, and therefore it is conventional practice to disposed or recycle such products. In a recycling process, fibers are cut, melted at high temperature, granulated, and again melted at high temperature, so as to produce other products according to the requirements. However, cutting, melting, granulating, molding and other procedures in the recycling method require high-power devices, which consume a large quantity of energy, as well as a large amount of manpower due to high-frequency operations. The process also produce a large amount of lint and dust during the fiber cutting procedure, which further causes physical damage to operators, and causes secondary pollution and a large energy consumption, thereby adversely affecting the environment.

SUMMARY

Purpose: The present invention is intended to provide a carpet made from recycled yarns, so as to reduce energy consumption and secondary pollution in the yarn recycling process. The carpet has the advantages such as soft feeling, high comfort, good resilience, stable physical properties, and good heat insulation effect.

The present invention is further intended to provide a method for manufacturing the carpet made from recycled yarns.

Technical Scheme:

A soft-substrate carpet made from recycled yarns, comprising a carpet fiber layer and a recycled fiber layer in a top-to-bottom order, wherein the carpet fiber layer comprises carpet fibers and a first non-woven scrim, the carpet fibers being tufted on the first non-woven scrim, and the recycled fiber layer comprises recycled fibers and a second non-woven scrim, the recycled fibers being tufted on the second non-woven scrim; the tufted surfaces of the carpet fiber layer and the recycled fiber layer comprise loop pile, cut pile or a mixed style of loop pile and cut pile.

The carpet fiber layer and the recycled fiber layer are permanently bonded.

The carpet fibers are made from PP, PET, PTT, nylon, PO or wool, preferably nylon or PP.

Both the first non-woven scrim and the second non-woven scrim have a fabric weight of 70-150 $g/m^2$, preferably 90-100 $g/m^2$.

The carpet fiber layer and the recycled fiber layer are bonded together by a bonding agent.

The bonding agent is made from PVC, bitumen, PO, PU, PE or EVA, preferably PO.

A latex layer is disposed between the carpet fiber layer and the recycled fiber layer.

The latex layer is made from EVA, aqueous PU, acryl or SBR, preferably SBR.

A non-woven layer is disposed under the recycled fiber layer.

The recycled fiber layer and the non-woven layer are connected by a bonding agent.

The non-woven layer has a fabric weight of 50-1200 $g/m^2$, preferably 50-300 $g/m^2$%.

The non-woven layer has a heat shrinkage rate less than 2%.

The recycled fiber layer has a pile number not less than 100000 piles/$m^2$.

A method for manufacturing the above soft-substrate carpet made from recycled yarns, comprising:

(1) tufting the carpet fibers: tufting the carpet fibers on the first non-woven scrim to give the carpet fiber layer, wherein the carpet fibers are made from PP, PET, PTT, nylon, PO or wool;

(2) pre-coating and drying latex: uniformly mixing aqueous latex SBR, an antibacterial agent, calcium carbonate and a foaming agent according to a mass ratio of (62-100):(0-1):(0-35):(0-2), preferably (65-70):(0-1):(28-35):(0-1), performing air foaming using a foaming machine with a foaming ratio of 1.2-10 folds, preferably 1.5-3 folds, uniformly coating the mixture on the back surface of the carpet fiber layer with a dry coating weight of 50-800 $g/m^2$, preferably 80-350 $g/m^2$, and drying to give the latex layer;

(3) tufting the recycled fibers: classifying the recycled fibers, plying the recycled fibers into 850-4000 D thick recycled fibers, and tufting the thick recycled fibers on the second non-woven scrim to give the recycled fiber layer, wherein the recycled fiber layer has a pile density of 100000-450000 piles/$m^2$, and a pile height of 2.5-12 mm, preferably 3.5-6.5 mm;

(4) preparing a soft substrate of the tufted recycled fibers: mixing PO and calcium carbonate according to a mass ratio of (20-45):(55-80), preferably (20-30):(70-80), heating and melting the mixture, uniformly stirring, cooling and granulating to give PO-calcium carbonate bonding agent particles; feeding the PO-calcium carbonate bonding agent particles into a carpet bonding machine, heating and melting at 130-220° C., flatly coating the resulting bonding agent on the tufted surface of the recycled fiber layer using an extruder, scraping to a height of 0.5-1.0 mm, preferably a height of 0.5-0.8 mm, using a scraper, with an amount of the PO-calcium carbonate bonding agent being 150-2000 $g/m^2$, preferably 500-800 $g/m^2$, bonding the tufted recycled fiber layer and the non-woven layer together, compacting with a roller, and cooling to 5-30° C. to form the soft substrate layer of tufted recycled fibers; and (5) bonding the carpet fiber layer and the recycled fiber layer together: mixing PO and calcium carbonate according to a mass ratio of (25-50):(50-75), preferably (25-35):(65-75), heating and melting the mixture, cooling and granulating to give PO-calcium carbonate bonding agent particles;

feeding the PO-calcium carbonate bonding agent particles into the carpet bonding machine, heating and melting the PO-calcium carbonate bonding agent particles at 130-220° C., flatly coating the resulting bonding agent on the back surface of the soft substrate layer of tufted recycled fibers using the extruder, scraping redundant parts using the scraper, and bonding with the latex surface of the tufted carpet fiber layer with an amount of the PO-calcium carbonate bonding agent controlled at 500-2500 g/m² and a thickness of 0.8-1.5 mm; and after bonding, compacting with a roller, and putting the carpet into a cooling chamber at 5-30° C. for cooling.

In step (2), the drying conditions are as follows: a drying temperature at 140-200° C., and a drying time of 2-8 min.

The recycled yarns need to be categorized for recycling and production according to the material of yarns, and the recycled fibers of the same material further needs to be categorized according to fiber thickness (denier number D). Specifically, fibers of the same or similar D can be put together while fibers of different D or greater difference in D should be distinguished. According to the requirements of fiber thickness during tufting, the thinner fibers can approach or approximate the thickness of tufted fibers by means of plying, and can be tufted on the second non-woven scrim. Categorized fibers for a recycled fiber layer shall have consistent heat shrinkage rate within a range of ±3%.

Defective products may be produced during the production process of yarn fibers due to color bias, physical property bias, color changes and the like. The recycled fibers described herein are such unusable fibers due to the color bias, physical property bias and color changes. In the prior art, defective products are directly disposed or recycled. For direct disposal, the production cost increases due to the wasted materials. The present invention classifies the recycled fibers as PP, nylon, PET, PTT, PO, wool or the like according to their materials, and classifies the defective products according to their fiber thickness and heat shrinkage rate. The recycled fibers of the same material are further categorized according to fiber thickness (denier number D). Specifically, fibers of the same or similar D can be put together while fibers of different D or greater difference in D should be distinguished. According to the requirements of fiber thickness during tufting, the thinner fibers can approach or approximate the thickness of tufted fibers by means of plying, and can be tufted on the second non-woven scrim. For example, for recycled nylon fibers, 1100-D yarns are plied into 2200-D yarns, and 680-D yarns are plied into 2040-D yarns. Categorized fibers for a recycled fiber layer shall have consistent heat shrinkage rate within a range of ±3%.

The purpose of such classification is to ensure that the raw material, thickness, height and density of the fibers are uniform and consistent in the whole production process. In order to ensure the flatness of the recycled fiber layer in use, the consistency in pile height in the carpet tufting process should be strictly controlled within ±2 mm, so as to ensure that the consistencies in comfort and softness of the whole batch of products.

Beneficial Effects:

Based on the concept of environmental protection, the present invention provides a carpet which is environment-friendly, safe and comfortable by reducing the amount of PVC and bitumen used as much as possible or even eliminating the use of such raw materials on the basis of conventional carpet production process.

The present invention has the advantages of soft feeling, high comfort, good resilience, stable physical properties, good heat insulation effect and the like. The present invention can not only put an end to the disposal of defective fibers produced by the facility, but also can utilize defective products produced by other manufacturers. On the premise of no additional devices, the defective fibers are directly used in the carpet utilizing the existing devices in the industry, which actually saves energy and reduces emission to the maximum extent.

In the present invention, the recycled fibers are tufted on a non-woven scrim therefore adopting a three-dimensional fiber structure which increases the resilience of the soft substrate, in comparison to the 2 dimensional transverse or longitudinal intermingling of the existing non-woven substrate production technology. For environmental influence such as thermal expansion and cold contraction, the carpet substrate adopting the three-dimensional structure has good stability, and increased softness and resilience, and further improves the overall stability of the carpet.

DETAILED DESCRIPTION

The technical scheme of the present invention is further described below with reference to the drawings.

Figure 1:
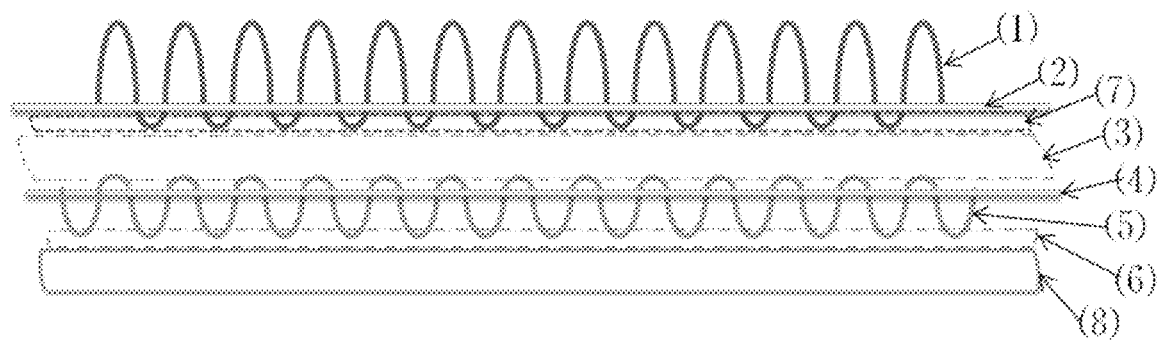
FIG. 1 is a schematic diagram of the structure according to present invention.
Figure 2:
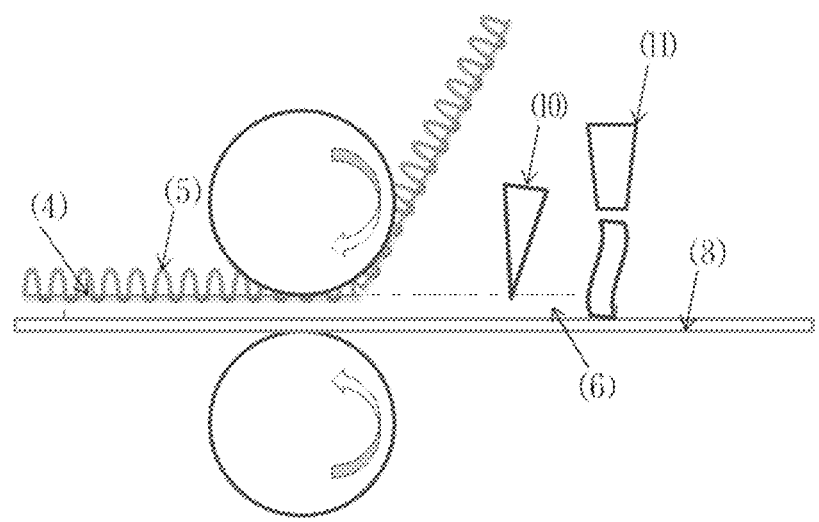
FIG. 2 is a schematic diagram of the manufacturing process according to the present invention.
Figure 3:
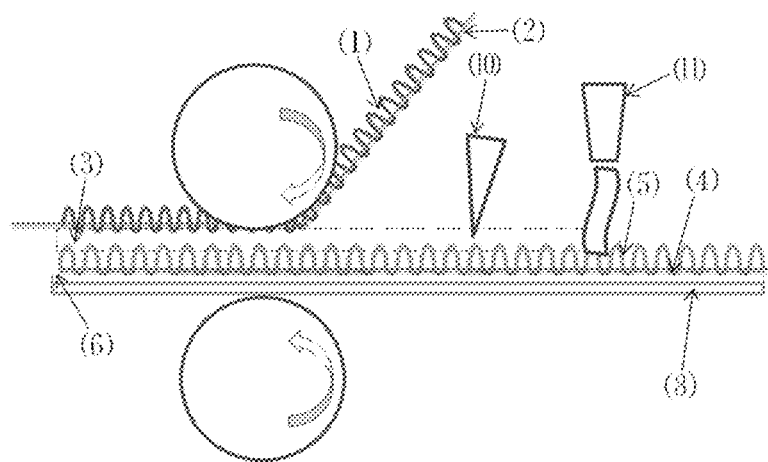
FIG. 3 is another schematic diagram of the manufacturing process according to the present invention.

In FIG. 1, 1 is a carpet fiber, 2 is a first non-woven scrim, 3 is a first resin bonding layer, 4 is a second non-woven scrim, 5 is a recycled fiber, 6 is a second resin bonding layer, 7 is a latex layer, and 8 is a non-woven.

A soft-substrate carpet made from recycled yarns, comprising a carpet fiber layer and a recycled fiber layer disposed in a top-to-bottom order, wherein the carpet fiber layer comprises carpet fibers and a first non-woven scrim, the carpet fibers being tufted on the first non-woven scrim, and the recycled fiber layer comprises recycled fibers and a second non-woven scrim, the recycled fibers being tufted on the second non-woven scrim; the tufted surfaces of the carpet fiber layer and the recycled fiber layer comprise loop pile, cut pile or a mixed style of loop pile and cut pile.

The carpet fiber layer and the recycled fiber layer are permanently bonded.

The carpet fibers are made from PP, PET, PTT, nylon, PO or wool.

Both the first non-woven scrim and the second non-woven scrim have a fabric weight of 70-150 g/m², a thickness not more than 1.2 mm, a strength not less than 10 kgf and a heat shrinkage rate lower than 0.9%. The non-woven scrim is a high-quality non-woven material and features high strength and dimensional stability in the transverse direction; the first non-woven scrim and the second non-woven scrim are made from polyester.

The carpet fiber layer and the recycled fiber layer are bonded together by a bonding agent.

The bonding agent is made from PVC, bitumen, PO, PU, PE or EVA. The bonding agent is used for bonding the carpet fiber layer and the recycled fiber layer, and can also be used for bonding the recycled fiber layer and the non-woven layer. The preferred material of the bonding agent is PO, and PO and calcium carbonate are mixed according to a mass ratio of (25-50):(50-75).

The proportion can be modified or other additives can be added according to the requirements. Firstly, PO and calcium carbonate are mixed according to a mass ratio of (25-50):(50-75), the mixture is heated and melted, the melted PO and calcium carbonate are uniformly stirred to ensure calcium carbonate is well dispersed. The resulting mixture is cooled, granulated, and fed to a carpet bonding machine. The raw materials are heated and melted at 130-220° C., and then fed into a feeding port of the carpet bonding machine for later extrusion and coating. The resulting bonding agent is flatly coated on the back surface of the soft substrate layer of tufted recycled fibers using a scraper. Redundant parts are removed, and the back surface and the latex surface of the carpet fiber layer are bonded together, with an amount controlled at 500-2500 g/m$^2$ and a thickness controlled at 0.8-1.5 mm according to the actual requirement of production. After coating, the carpet is put into a cooling chamber at 5-30° C. for stable cooling under a condition ensuring the flatness of the product in the cooling process. The cooled product is cut to give the finished product.

Preferably, a latex layer is disposed between the carpet fiber layer and the recycled fiber layer, and is made from EVA, aqueous PU, acryl or SBR, preferably SBR. The addition of the latex layer enables higher resilience and better softness of the carpet. The dry coating weight of EVA, aqueous PU, acryl or SBR is 50-800 g/m$^2$, and the coating mode is foaming and gluing.

The preferred formulation of the latex layer is as follow: the mass ratio of SBR to antibacterial agent to calcium carbonate to foaming agent is (62-100):(0-1):(0-35):(0-2), wherein the antibacterial agent, the calcium carbonate and the foaming agent are optional components.

The preparation method of the latex layer comprises: SBR, an antibacterial agent, calcium carbonate and a foaming agent are fed into a stirring tank according to a mass ratio and uniformly stirred. A foaming process is performed mixture using a foaming machine. The mixture is uniformly coated on the back surface of the carpet fiber layer, and the redundant parts are removed by scraping. The dry coating weight is 50-800 g/m$^2$, such that a fiber reinforcement effect is provided to avoid appearance defects caused by falling off. After coating, the carpet is dried in a drying oven at 140-200° C. at a speed of 5 m/min for 2-8 min. After the latex is dried completely, the carpet is rolled for later use.

In the method, a non-woven layer is disposed under the recycled fiber layer, and the heat shrinkage rate of the non-woven layer is lower than 2%; the fabric weight range is 50-1200 g/m$^2$. The non-woven layer is an unnecessary structure, which is used for further improving the appearance or the stability of the carpet. The non-woven layer can be made from polyester or nylon, which provides a heat shrinkage rate lower than 2%, unlikeliness to fluff or layer, and a fabric weight of 50-1200 g/m$^2$.

Example 1: A Method for Manufacturing the Soft-Substrate Carpet Made from Recycled Yarns, Comprising (1) Tufting Carpet Fibers Nylon fibers were tufted on a first non-woven scrim using a tufting machine to form a carpet fiber layer, and the carpet was rolled for later use. One surface of the carpet fiber layer with pile is the tufted surface, the other surface is the back surface for latex pre-coating.

(2) Pre-Coating and Drying Latex

An aqueous environment-friendly latex SBR was used in a mass ratio of SBR to an antibacterial agent to calcium carbonate to a foaming agent being (62-100):(0-1):(0-35):(0-2), preferably a mass ratio of (65-70):(0-1):(28-35):(0-1), wherein the content of the antibacterial agent and the foaming agent might be 0. The raw materials were fed into a stirring tank according to the mass ratio, and uniformly stirred. A foaming process was performed using a foaming machine in a foaming ratio of 1.2-10 folds, preferably 1.5-3.0 folds. The mixture was uniformly coated on the back surface of the tufted carpet fiber layer, and redundant latex was removed using a scraper. The dry coating weight was controlled at 50-800 g/m$^2$, preferably 80-350 g/m$^2$. After coating, the carpet was dried in a drying oven at 140-200° C. at a speed of 5 m/min for 2-8 min. After the latex was dried completely, the carpet is rolled for later use.

(3) Tufting Recycled Fibers

Plied thick recycled nylon fibers of about 850-4000 D were used as the recycled fibers. Fibers with the closer thickness were directly tufted on a second non-woven scrim through the tufting machine to give a recycled fiber layer, and the carpet was rolled for later use. The pile density of the tufted surface was 100000-450000 piles/m$^2$ and the pile height was 2.5-12 mm.

Specifically, the direction of bonding surfaces can be switched according to the requirement of the recycled fiber layer. This means that the back surface of the recycled fiber layer and the non-woven layer can be bonded together, and the tufted surface of the recycled fiber layer and the latex surface of the carpet fiber layer are bonded together.

(4) Preparing a PO Bonding Layer (the Second Resin Bonding Layer is an Unnecessary Structure)

PO and calcium carbonate were mixed in a mass ratio of (20-45):(55-80) (preferably (20-30):(70-80)), heated and melted (at the temperature of 130-220° C.), uniformly stirred, cooled (at 5-30° C.) and granulated (with a granule size less than 4-40 meshes). The melting process was carefully controlled to ensure that the uniformity of the granules. The raw materials were heated and melted at 130-220° C., fed into a feeding port 11 of a carpet bonding machine for later extrusion and coating. The resulting bonding agent was flatly coating on the tufted surface of the recycled fiber layer using a scraper 10 with a proper height of 0.5-1.0 mm (preferably 0.5-0.8 mm) and an amount controlled at 150-2000 g/m$^2$ (preferably 500-800 g/m$^2$). The recycled fiber layer and the non-woven layer were bonded together. The carpet was compacted using a roller, and stably cooled at 5-30° C. while ensuring the flatness of the product in the cooling process to form the soft substrate layer of tufted recycled fibers. The carpet was rolled for later use.

(5) Preparing Another PO Bonding Layer

PO and calcium carbonate were mixed in a mass ratio of (25-50):(50-75), heated and melted (at 130-220° C.). The melted PO and the calcium carbonate were uniformly stirred to ensure that calcium was well dispersed, and the mixture was cooled (at 5-30° C.) and granulated (with a granule size less than 4-40 meshes). The raw materials were heated and melted at 130-220° C., and then fed into a feeding port 11 of the carpet bonding machine for later extrusion and coating. The resulting bonding agent was flatly coated on the back surface of the soft substrate layer of tufted recycled fibers using a scraper 10. Redundant parts were removed, and the back surface and the latex surface of the carpet fiber layer were bonded together, with an amount controlled at 500-2500 g/m² (preferably 600-1200 g/m²) and a thickness controlled at 0.8-1.5 mm. After bonding, the carpet was compacted using a roller, and the carpet was put into a cooling box chamber at 5-30° C. for stable cooling under a condition ensuring the flatness of the product in the cooling process. The finished soft-substrate carpet was cut into a certain dimension according to the actual requirement.

According to the method for manufacturing the soft-substrate carpet made from recycled yarns, the measurements are as follows:

Example 2: Elastic Resilience Ratio by Castorchair Test

Finished square carpets with dimensions of 500×500 mm were measured for the overall thickness using a thickness gauge, and effective data were recorded. The measured carpets were placed and fixed on a bottom plate of a castorchair tester. A simulation castorchair with a load of 90 kg was put on the carpet surface. The number of revolution was set to 2000 before the tester was started. After the rotation test, the sample carpets were removed from the tester and horizontally placed for 24 h. After the above procedures were completed, the overall thickness of the samples was measured again using the thickness gauge to acquire effective data. The elastic resilience ratio was calculated by comparing the effective data.

Soft-substrate carpets of recycled yarns and soft-substrate carpets of recycled yarns without unnecessary structures were manufactured by the method of Example 1.

Conclusion: Since a higher elastic resilience ratio indicates a better resilience, the present invention demonstrates a superior resilience.

TABLE 1

Elastic resilience ratio of carpet disclosed herein and competitors in castorchair test

| Name | Soft-substrate carpet made from recycled yarns | Soft-substrate square carpet from competitor A | Soft-substrate square carpet from competitor B | PVC-substrate square carpet from competitor |
|---|---|---|---|---|
| Elastic resilience ratio in castorchair test | 97% | 94% | 95% | 88% |

TABLE 2

Elastic resilience ratio of carpet disclosed herein and carpets without unnecessary structures in castorchair test

| Name | Soft-substrate carpet made from recycled yarns | without unnecessary structures—Non-woven layer (8) | without unnecessary structures—Non-woven layer (8) and bonding layer (6) |
|---|---|---|---|
| Elastic resilience ratio in castorchair test | 97% | 98% | 98% |

2. Elastic Resilience Ratio in Hexapod Tumbler Test—Supplementary Data for Resilience Finished square carpets were measured for the overall thickness using a thickness gauge, and effective data were recorded. The finished carpets were cut into a certain dimension, and bonded to the inner wall of the tumbler. The number of revolution was set to 12,000 before the tester was started. After the rotation test, the sample carpets were removed from the tester and horizontally placed for 24 h. After the above procedures were completed, the overall thickness of the samples was measured again using the thickness gauge to acquire effective data. The elastic resilience ratio was calculated by comparing the effective data.

Conclusion: Since a higher elastic resilience ratio indicates a better resilience, the present invention demonstrates a superior resilience.

TABLE 3

Elastic resilience ratio of carpet disclosed herein and competitors in hexapod tumbler test

| Name | Soft-substrate carpet made from recycled yarns | Soft-substrate square carpet from competitor A | Soft-substrate square carpet from competitor B | PVC-substrate square carpet from competitor |
|---|---|---|---|---|
| Elastic resilience ratio in hexapod tumbler test | 93% | 91% | 83% | 71% |

TABLE 4

Elastic resilience ratio of carpet disclosed herein and carpets without unnecessary structures in hexapod tumbler test

| Name | Soft-substrate carpet made from recycled yarns | without unnecessary structures—Non-woven layer (8) | without unnecessary structures—Non-woven layer (8) and bonding layer (6) |
|---|---|---|---|
| Elastic resilience ratio in hexapod tumbler test | 93% | 95% | 96% |

3. Softness Test—Supplementary Data for Soft Feeling and High Comfort

Finished square carpets with dimensions of 500×500 mm were taken, and 25 evenly distributed sampling points were selected and measured using a hardness tester in a certain sequence. Data of the sampling points were recorded, and effective measurements were obtained by calculating the average value of the 25 sampling points.

Conclusion: Since a lower value indicates a higher softness, the present invention demonstrates good softness.

TABLE 5

Softness test of carpet disclosed herein and competitors

| Name | Soft-substrate carpet made from recycled yarns | Soft-substrate square carpet from competitor A | Soft-substrate square carpet from competitor B | Soft-substrate square carpet from competitor C | PVC-substrate square carpet from competitor |
|---|---|---|---|---|---|
| Softness test | 9.9 | 13.8 | 12.7 | 11.2 | 12.9 |

TABLE 6

Softness test of carpet disclosed herein and carpets without unnecessary structures

| Name | Soft-substrate carpet made from recycled yarns | without unnecessary structures— Non-woven layer (8) | without unnecessary structures—Non-woven layer (8) and bonding layer (6) |
|---|---|---|---|
| Softness test | 9.9 | 10.5 | 10.8 |

4. Thermal Insulation Effect—Supplementary Data for Good Thermal Insulation Effect Finished square carpets were cut into a certain dimension completely consistent with that of the iron plate. The sample pieces were placed to cover the iron plate of the tester. The temperature of the tester was set to 80° C. and the temperature was maintained until the end of the test. After the finished square carpet pieces were placed on the iron plate of the device at 80° C., the initial temperature of the center of the carpet surface was immediately measured and effective data were recorded. A thermal conductivity temperature testing was performed on the carpet surface every 6 min, and effective data were recorded.

TABLE 7

Thermal insulation test of carpet disclosed herein and competitors

| Name | Time (min) | Soft-substrate carpet made from recycled yarns | Soft-substrate square carpet from competitor A | Soft-substrate square carpet from competitor B | Recycled PVC-substrate from competitor | PVC-substrate square carpet from competitor |
|---|---|---|---|---|---|---|
| Thermal insulation test | 0 | 27.5° C. | 26.8° C. | 27.3° C. | 27.5° C. | 30.8° C. |
| | 6 | 40.8° C. | 49° C. | 44.2° C. | 58.1° C. | 56.2° C. |
| | 12 | 48.3° C. | 54.6° C. | 50.9° C. | 58.2° C. | 57° C. |
| | 18 | 49.4° C. | 55° C. | 52.7° C. | 59.2° C. | 60.2° C. |

TABLE 8

Thermal insulation test of carpet disclosed herein and carpets without unnecessary structures

| Name | Time (min) | Soft-substrate carpet made from recycled yarns | without unnecessary structures— Non-woven layer (8) | without unnecessary structures— Non-woven layer (8) and bonding layer (6) |
|---|---|---|---|---|
| Thermal insulation test | 0 | 27.5° C. | 27.1° C. | 26.9° C. |
| | 6 | 40.8° C. | 41.1° C. | 41.2° C. |
| | 12 | 48.3° C. | 47.4° C. | 47.1° C. |
| | 18 | 49.4° C. | 51.1° C. | 51.6° C. |

Conclusion: Since a lower surface temperature indicates a poor thermal conductivity, the present invention demonstrates a good thermal insulation effect.

What is claimed is:

1. A method for manufacturing a soft-substrate carpet made from recycled yarns, comprising:
   (1) tufting carpet fibers into a first non-woven scrim to form a carpet fiber layer;
   (2) uniformly mixing aqueous styrene butadiene rubber (SBR) latex, an anti-bacterial agent, calcium carbonate and a foaming agent according to a mass ratio of (62-100):(0-1):(0-35):(0-2) to form an SBR latex mixture, air foaming the SBR latex mixture with a foaming ratio of 1.2-10, uniformly coating the SBR latex mixture on a back surface of the carpet fiber layer with a dry coating weight of 50-800 g/m$^2$, and drying the SBR latex coating to form a latex layer having a latex surface;
   (3) classifying recycled fibers, plying the recycled fibers into 850-4000 denier thick recycled fibers, and tufting the thick recycled fibers into a second non-woven scrim to form a recycled fiber layer having a tufted surface;
   (4) mixing polyolefin (PO) and calcium carbonate according to a mass ratio of (20-45):(55-80) to form a first PO mixture, heating and melting the first PO mixture, uniformly stirring, cooling and granulating the first PO mixture to form first PO-calcium carbonate bonding agent particles; feeding the first PO-calcium carbonate bonding agent particles into a carpet coater, heating and melting the first PO-calcium carbonate bonding agent particles at 130-220° C., flatly coating a resulting first PO-calcium carbonate bonding agent on the tufted surface of the recycled fiber layer using an extruder, scraping the applied first PO-calcium carbonate bonding agent to a height of 0.5-1.0 mm using a scraper with an applied amount of the first PO-calcium carbonate bonding agent being 150-2000 g/m$^2$, bonding the tufted recycled fiber layer and a non-woven layer together with the applied first PO-calcium carbonate bonding agent to form a soft substrate laminate, compacting the soft substrate laminate with a roller, and cooling the soft substrate laminate to 5-30° C. to form a soft substrate layer having a back surface; and
   (5) mixing PO and calcium carbonate according to a mass ratio of (25-50):(50-75) to form a second PO mixture, heating and melting the second PO mixture, cooling and granulating the second PO mixture to form second PO-calcium carbonate bonding agent particles; feeding the second PO-calcium carbonate bonding agent particles into the carpet coater, heating and melting the second PO-calcium carbonate bonding agent particles at 130-220° C., flatly coating a resulting second PO-calcium carbonate bonding agent on the back surface of the soft substrate layer using the extruder, scraping the applied second PO-calcium carbonate bonding agent using the scraper, and bonding the back surface of the soft substrate layer to the latex surface of the carpet fiber layer to form a carpet laminate with an applied amount of the second PO-calcium carbonate bonding agent controlled at 500-2500 g/m$^2$ and a thickness of 0.8-1.5 mm; compacting the carpet laminate with a roller to form the soft-substrate carpet, and putting the soft-substrate carpet into a cooling chamber at 5-30° C. to cool the soft-substrate carpet; wherein in step (2), the drying is performed at a drying temperature of 140-200° C., and for a drying time of 2-8 min.

* * * * *